US012522672B2

(12) United States Patent
Wondraczek

(10) Patent No.: US 12,522,672 B2
(45) Date of Patent: Jan. 13, 2026

(54) METHOD FOR EXTRACTING XYLAN COMPOUNDS FROM COMMINUTED WOOD COMPONENTS

(71) Applicant: HV-POLYSACCHARIDES GMBH & CO. KG, Bucha (DE)

(72) Inventor: Holger Wondraczek, Jena (DE)

(73) Assignee: HV-POLYSACCHARIDES GMBH & CO. KG, Bucha (DE)

( * ) Notice: Subject to any disclaimer, the term of this patent is extended or adjusted under 35 U.S.C. 154(b) by 694 days.

(21) Appl. No.: 17/794,963

(22) PCT Filed: Jan. 13, 2021

(86) PCT No.: PCT/EP2021/050505
§ 371 (c)(1),
(2) Date: Jul. 23, 2022

(87) PCT Pub. No.: WO2021/151656
PCT Pub. Date: Aug. 5, 2021

(65) Prior Publication Data
US 2023/0066973 A1 Mar. 2, 2023

(30) Foreign Application Priority Data
Jan. 28, 2020 (DE) .......................... 102020101915.7

(51) Int. Cl.
C08B 37/00 (2006.01)
(52) U.S. Cl.
CPC ................................ C08B 37/0057 (2013.01)
(58) Field of Classification Search
CPC .......................... C08B 37/0057; C08B 37/0003
See application file for complete search history.

(56) References Cited

U.S. PATENT DOCUMENTS

| 7,198,695 | B2 | 4/2007 | Kettenbach et al. ........... 162/72 |
| 8,529,731 | B2 | 9/2013 | Varma ............................. 162/96 |
| 8,932,840 | B2 | 1/2015 | Van Der Heide et al. ... 435/160 |
| 10,407,452 | B2 | 9/2019 | Von Schoultz | |
| 10,870,711 | B2 | 12/2020 | De Ferra et al. | |
| 11,046,790 | B2 | 6/2021 | Vähäsalo et al. | |
| 2011/0094505 | A1 | 4/2011 | Bulla et al. ....................... 127/37 |
| 2011/0263004 | A1 | 10/2011 | Ilvesniemi et al. ........... 435/274 |
| 2015/0064331 | A1 | 3/2015 | Krogerus et al. ............. 426/573 |

FOREIGN PATENT DOCUMENTS

| CH | 290145 | A | 4/1953 | ............. C08B 37/14 |
| CN | 1494624 | A | 5/2004 | ................. C08B 1/00 |
| CN | 101120102 | A | 2/2008 | ................. C08H 8/00 |
| CN | 101821320 | A | 9/2010 | ................. C08H 8/00 |
| CN | 103814141 | A | 5/2014 | ............. C13K 13/00 |
| CN | 104302675 | A | 1/2015 | ........... A23L 29/206 |
| CN | 106029978 | A | 10/2016 | ................. D21C 1/10 |
| CN | 107636021 | A | 1/2018 | ........... A61K 31/737 |
| CN | 109134707 | A | 1/2019 | ............. C08B 37/14 |
| CN | 109153822 | A | 1/2019 | ................. C08L 5/14 |
| CN | 110627924 | A | 12/2019 | ........... A61K 31/715 |
| JP | S6462303 | A | 3/1989 | ............. A23L 1/308 |
| JP | 2000236899 | A | 9/2000 | ................. A23L 1/09 |
| JP | 2002059118 | A | 2/2002 | ................. B01J 3/00 |
| JP | 2005023041 | A | 1/2005 | ................. A23L 1/09 |
| JP | 2006075067 | A | 3/2006 | ................. B01J 3/00 |
| JP | 2011144336 | A | 7/2011 | ............. C08B 37/00 |
| JP | 2011144337 | A | 7/2011 | ............. C08B 15/00 |
| JP | 2011523349 | A | 8/2011 | ............. B09B 3/00 |
| JP | 2013085523 | A | 5/2013 | ............. C13K 1/02 |
| WO | WO2009031164 | A1 | 3/2009 | ............. C08H 8/00 |
| WO | WO2009122018 | A2 | 10/2009 | ............. D21C 5/00 |
| WO | WO2017222084 | A1 | 12/2017 | ............. C07H 3/02 |

OTHER PUBLICATIONS

Gallina et al., Bioresource Technology, 2018, 247, p. 980-991. (Year: 2018).*
Peng et al., J. Agric. Food Chem., 2009, 57, p. 6305-6317. (Year: 2009).*
Daus et al., Macromol. Mater. Eng., 2011, 296, p. 551-561. (Year: 2011).*
The Notification Concerning Transmittal of International Preliminary Report on Patentability (Chapter I of the Patent Cooperation Treaty), in English, dated Aug. 11, 2022, which was issued by the International Bureau of WIPO in Applicant's corresponding international PCT application having Serial No. PCT/EP2021/050505, filed on Jan. 13, 2021.
The English translation of the International Preliminary Report on Patentability (Chapter I of the Patent Cooperation Treaty), dated Jul. 28, 2022, which was issued by the International Bureau of WIPO in Applicant's corresponding international PCT application having Serial No. PCT/EP2021/050505, filed on Jan. 13, 2021.
The Written Opinion of the International Searching Authority, in English, dated May 6, 2021, which was issued by the International Bureau of WIPO in Applicant's corresponding international PCT application having Serial No. PCT/EP2021/050505, filed on Jan. 13, 2021.
The International Search Report, in English, dated May 6, 2021, which was issued by the International Bureau of WIPO in Applicant's corresponding international PCT application having Serial No. PCT/EP2021/050505, filed on Jan. 13, 2021.
Grénman, et al., "Kinetics of Aqueous Extraction of Hemicelluloses from Spruce in an Intensified Reactor System", Industrial & Engineering Chemistry Research, vol. 50, Issue 7, Mar. 3, 2011, pp. 3818-3828, XP93146852. Abstract available at: https://pubs.acs.org/doi/10.1021/ie101946c (last accessed on Jul. 31, 2025) (copy not enclosed).
Rissanen, et al., "Spruce Hemicellulose for Chemicals Using Aqueous Extraction: Kinectics, Mass Transfer, and Modeling", Industrial & Engineering Chemistry Research, vol. 53, Issue 15, Apr. 2, 2014, pp. 6341-6350, XP93146853. Abstract available at: https://pubs.acs.org/doi/10.1021/ie500234i (last accessed on Jul. 31, 2025) (copy not enclosed).

(Continued)

Primary Examiner — Jonathan S Lau
(74) Attorney, Agent, or Firm — Bodner & Bodner, PLLC; Christian P. Bodner; Gerald T. Bodner

(57) ABSTRACT

The invention relates to a process for extracting xylan compounds from comminuted wood components using hydrothermal extraction, wherein the hydrothermal extraction is carried out in a fixed-bed reactor with rapid circulation.

16 Claims, 9 Drawing Sheets

(56) References Cited

OTHER PUBLICATIONS

Figure 1:
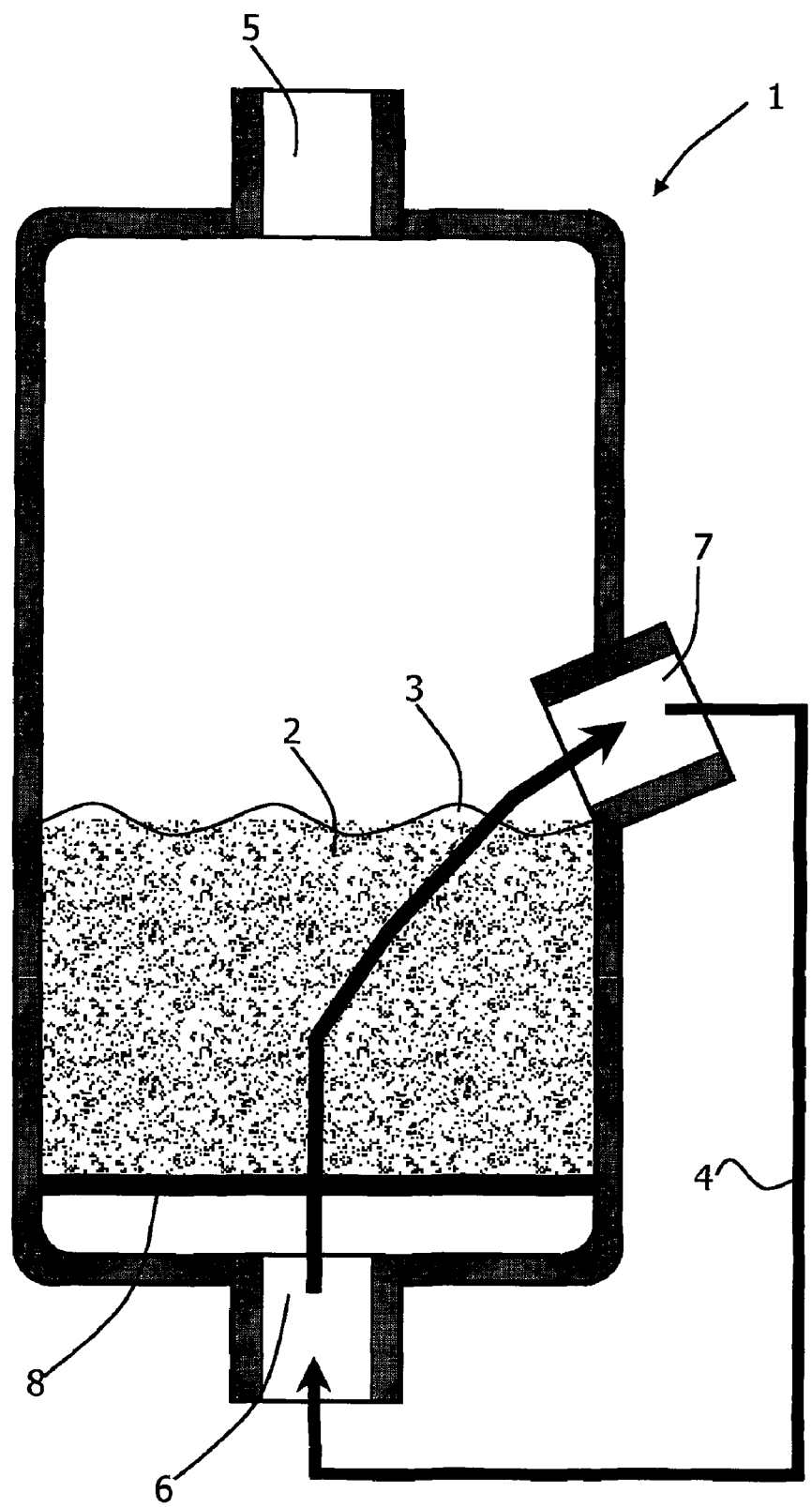

Krogell, et al., *"Intensification of hemicellulose hot-water extraction from spruce wood in a batch extractor—Effects of wood particle"*, Bioresource Technology, Elsevier, vol. 143, Jun. 3, 2013, pp. 212-220, XP028680203. Abstract and portions of the text available at: https://www.sciencedirect.com/science/article/abs/pii/S0960852413008869 (last accessed on Jul. 31, 2025) (copy not enclosed).

Chenghou, et al., *"Research Progress in Xylose Preparation Technology"*, Guangxi Journal of Light Industry, Issue 11, Nov. 15, 2011, pp. 21-23. Abstract available at: https://caod.oriprobe.com/articles/28536857/mu_tang_zhi_bei_ji_shu_yan_jiu_jin_zhan_.htm (last accessed on Jul. 31, 2025) (copy not enclosed).

Wei, et al., *"Research Progress on Hydrothermal Liquefaction of Lignocellulosic Biomass"*, Chemical Industry and Engineering Progress, Issue 2, Feb. 5, 2016, pp. 453-462. https://caod.oriprobe.com/articles/47508364/Research_progress_of_hydrothermal_liquefaction_of_lignocellulosic_biom.htm (last accessed on Jul. 31, 2025) (copy not enclosed).

Rissanen, et al., *"Spruce Hemicellulose for Chemicals Using Aqueous Extraction: Kinetics, Mass Transfer, and Modeling"*, Industrial & Engineering Chemistry Research, vol. 53, Issue 15, Apr. 2, 2014, pp. 6341-6350, XP93146853. Abstract available at: https://pubs.acs.org/doi/10.1021/ie500234t (last accessed on Jul. 31, 2025) (copy not enclosed).

Wei, et al., *"Research Progress on Hydrothermal Liquefaction of Lignocellulosic Biomass"*, Chemical Industry and Engineering Progress, Issue 2, Feb. 5, 2016, pp. 453-462. Abstract available at: https://caod.oriprobe.com/articles/47508364/Research_progress_of_hydrothermal_liquefaction_of_lignocellulosic_biom.htm (last accessed on Jul. 31, 2025) (copy not enclosed).

Communication Pursuant to Article 94(3) EPC (in German), dated Apr. 5, 2024, issued by the European Patent Office in Applicant's related European Patent Application No. EP21701410.9.

Notice of Rejection (in Japanese) and an English translation thereof, dated Aug. 16, 2024, issued by the Japanese Patent Office for Applicant's related Japanese Patent Application No. 2022-570753.

An Office Action (in Chinese) and an English translation thereof, dated Sep. 5, 2023, issued by the China National Intellectual Property Administration for Applicant's related Chinese Patent Application No. CN202180016262.5.

An Office Action (in Chinese) and an English translation thereof, dated Jan. 30, 2024, issued by the China National Intellectual Property Administration for Applicant's related Chinese Patent Application No. CN202180016262.5.

An Office Action (in Hindi and English), dated Nov. 29, 2023, issued by the Indian Patent Office for Applicant's related Indian Patent Application No. IN202217048804.

\* cited by examiner

METHOD FOR EXTRACTING XYLAN COMPOUNDS FROM COMMINUTED WOOD COMPONENTS

The invention relates to a method for extracting xylan compounds from comminuted wood components according to claim 1.

Pentosan polysulphate (in the following abbreviated as PPS) is a semi-synthetic substance which is obtained starting from vegetal raw materials, in particular beech wood, in a multistage process and can be used for treating different diseases.

The manufacture and clinical application of PPS is known in principle since 1944 and can be withdrawn, for example, from the printed document CH 290145. The process for manufacturing it as well as the impact on certain product features has been continuously improved and further developed over decades. On this occasion, it had been found in particular that PPS having a certain molecular mass as well as a degree of functionalization as high as possible is particularly well suited for pharmaceutical applications.

Different, partly very similar technical solutions published as of the mid 2000s, are focused, on the one hand, on adjusting the desired molecular mass and, on the other hand, on obtaining a degree of sulphation of PPS as high as possible. In this case, different methods of purification and proceeding are employed. These overcome various problems of different method aspects. These methods, however, are all based on a very similar strategy and frequently only differ in the selection of the solvents used or the technical approaches used for purifying the arising intermediate products or the final product.

According to the known state of the art, a xylan not defined in greater detail which is obtained from beech wood is converted into a raw product of sulphated xylan or raw PPS by conversion with chlorosulphonic acid in a solvent mixture of pyridine and dimethylformamide or a similar solvent or solvent mixture. Subsequently, the molar mass of the raw product is adjusted to the required target value by an acidic, oxidative or a combined process. In a last step, the raw product adjusted with respect to the molar mass is processed again in a solvent mixture with chlorosulphonic acid so as to obtain the actual target product.

Thus, at least three further essential method steps are required after the actual extraction of the xylan from the wood components, in order to obtain the final product PPS having the desired molar mass and a desired degree of sulphation. Usually, these method steps require further detailed steps such as purification, intermediary isolation and more intermediary processes like that, which in addition make the known method to be complicated.

The task is therefore to propose a method by means of which xylan may be obtained in a form by means of which the subsequent generation of PPS can be executed with a minimum number of steps.

The solution of the task is performed by a method for extracting xylan compounds from comminuted wood components having the features of claim 1.

The method for extracting xylan compounds, which can be converted into pentosan polysulphate by subsequent sulphation, using comminuted wood components while using hydrothermal extraction, is performed according to the invention in such a way that the hydrothermal extraction is carried out in a pressure reactor system for heterogenous reactions in a discontinuous operating mode.

In a configuration of the method, per kilogram of dry mass of the wood components, a mass of aqueous extracting agent of at least 3 kilograms, at most 15 kilograms, preferably at most 7 kilograms is used in the hydrothermal extraction.

In a further specific configuration of the method, the hydrothermal extraction is carried out by a bath circulation of the aqueous extracting agent in a pressure reactor system, wherein the pressure reactor system is implemented as a fixed-bed reactor.

Specifically, in a preferred operating mode, the hydrothermal extraction with the bath circulation is carried out by the following steps:

At the beginning, a reaction bed is prepared by filling a pressure vessel of the fixed-bed reactor with the comminuted wood components. This reaction bed is filled up with an aqueous extracting agent, in particular with water. The term "filled up" means in this context that the liquid level of the aqueous extracting agent substantially corresponds to the liquid level of the rection bed of the comminuted wood components.

Thereafter, the entire amount of the extracting agent is circulated via an extracting agent circuit within a predetermined duration of time at a predetermined temporal course of the temperature of the circulated extracting agent.

Finally, the entire extracting agent volume is finally withdrawn from the fixed-bed reactor and the dissolved xylan compounds in the extracting agent volume are subsequently isolated.

The method according to the invention is thereby based on the surprising finding that during a bath circulation in a fixed-bed reactor, the molecular mass distribution and further chemical and molecular properties may be influenced decisively already during extracting the xylan, provided that a number of certain and subsequently explained process parameters is observed. Hereby, it is possible to carry out the intermediary steps otherwise required in manufacturing PPS from xylan already during the extraction of the xylan on the side, so to speak, and thus to completely save them as particular process steps.

In an advantageous configuration of the processing, after filling up of the reaction bed in the pressure vessel of the fixed-bed reactor with the aqueous extracting agent, a swelling bath circulation after a subsequent entire exchange of the extracting agent volume is performed as an intermediary step.

Hereby, initially arising pollutions may be washed out from the reaction bed. In this case, an actual extraction does not yet take place.

In an advantageous configuration of the invention, the circulation of the extracting agent volume is performed in the following partial steps:

A first dissolution phase with a first temperature regime is performed for increasing the solubility of the xylan compounds. This is followed by executing a second dissolution phase with a second temperature regime for adjusting the molecular mass and/or the degree of acetylation of the xylan compounds dissolved in the extracting agent. The two dissolution phases and the temperatures regimes observed on this occasion are the decisive influence parameters in this case for extracting xylan having the desired properties.

In a configuration of the method, a complete or partial exchange of the extracting agent is performed during the second dissolution phase, wherein a fractionated withdrawal of dissolved xylan compounds having different molecular masses and/or of dissolved xylan compounds having different degrees of acetylation is performed.

Complementarily, in the final withdrawal of the entire extracting agent volume and/or in the complete or partial exchange of the extracting agent, a conduction of the derived extracting agent through a lignin filtering unit may be performed with lignin portions being eliminated.

In the final withdrawal of the entire extracting agent volume and/or in the complete or partial exchange of the extracting agent, a heat transfer device for cooling the extracting agent may be used.

The heat transfer device may be an evaporator utilizing the heat given off by the extracting agent. Hereby, the concentration of the xylan in the derived extracting agent may be increased in addition.

The isolation of the xylan compounds dissolved in the derived extracting agent volume is advantageously performed by introducing the extracting agent into an alcohol volume with a subsequent precipitation reaction and a final filtering off.

Complementarily, when the extracting agent is introduced into the alcohol volume, a stepwise increase of the ratio of the extracting agent amount to the alcohol amount may be performed, wherein a fractionated precipitation is performed hereby according to the molecular mass of the xylan compounds.

As far as the temperature is concerned, a heating of the aqueous extracting agent during the swelling bath circulation to a temperature from 100° C. to 150° C. is carried out and the extracting agent is circulated for 10 to 90 minutes.

During the temperature regime in the dissolution phase, a heating of the extracting agent to a target temperature from at least 150° C. up to a maximum of 210° C. is performed in one embodiment, wherein at this target temperature, the extracting agent is circulated at least for 10 minutes up to a maximum of 50 minutes.

The extracted xylan compounds are appropriately sulphated to pentosan polysulphate (PPS) in a polar and basic solvent by means of sulfonic acid without the use of co-solvency.

The invention will be explained in more detail in the following on the basis of exemplary embodiments. The attached FIGS. 1 to 8 serve for clarification. The same reference numerals will be used for equal parts or parts of equal action.

Figure 2:
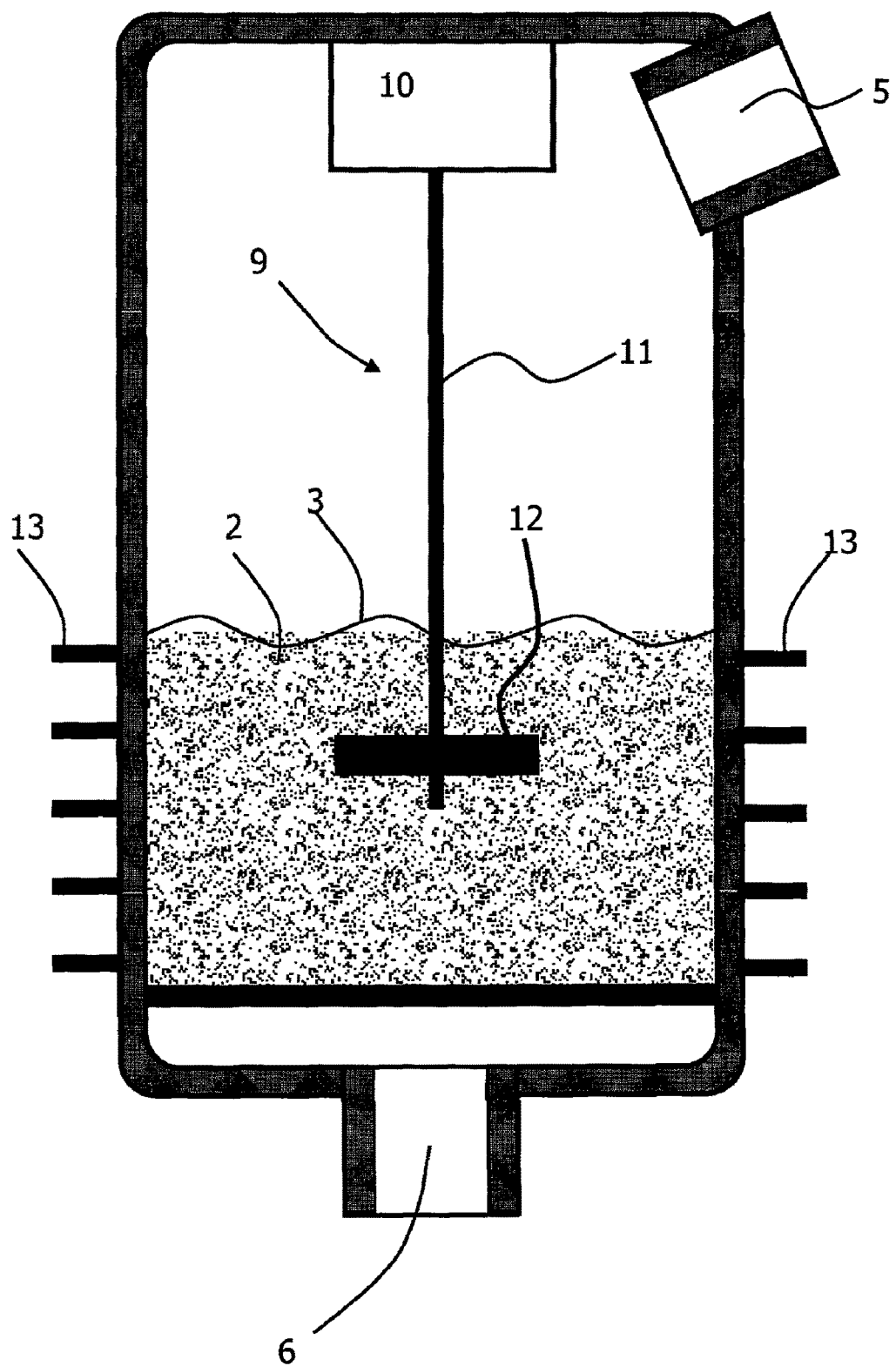
Figure 3:
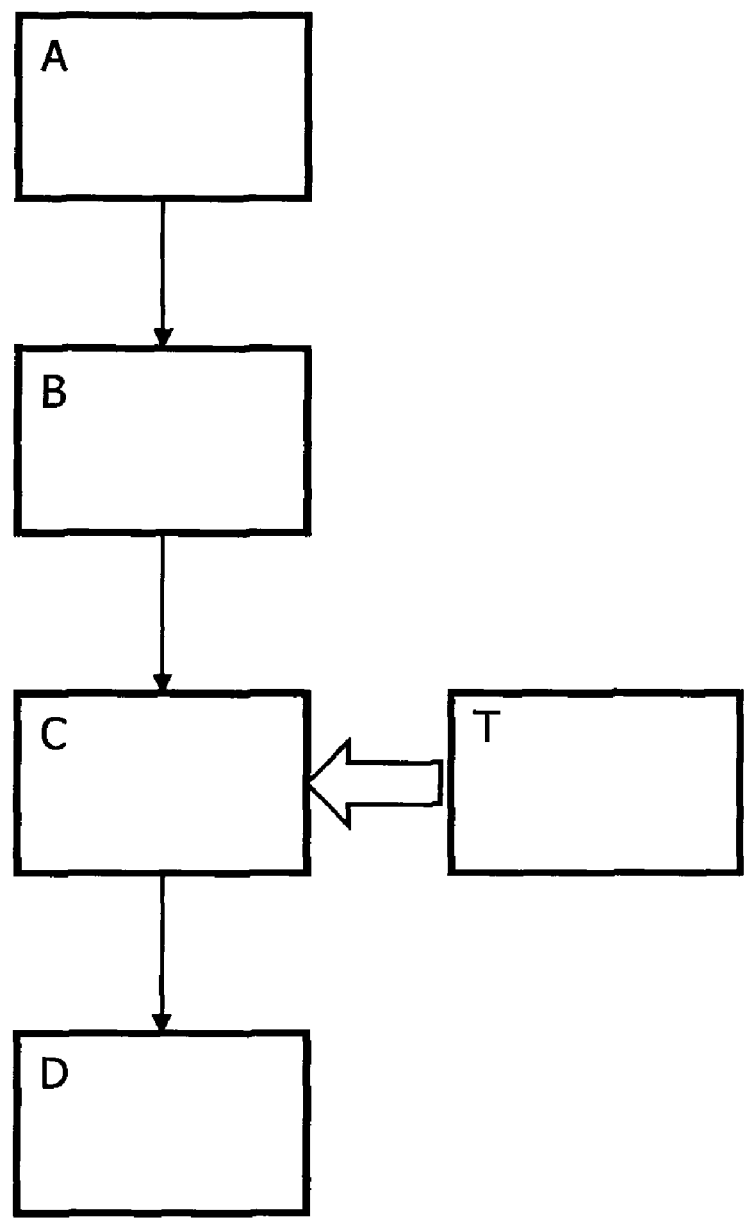
Figure 4:
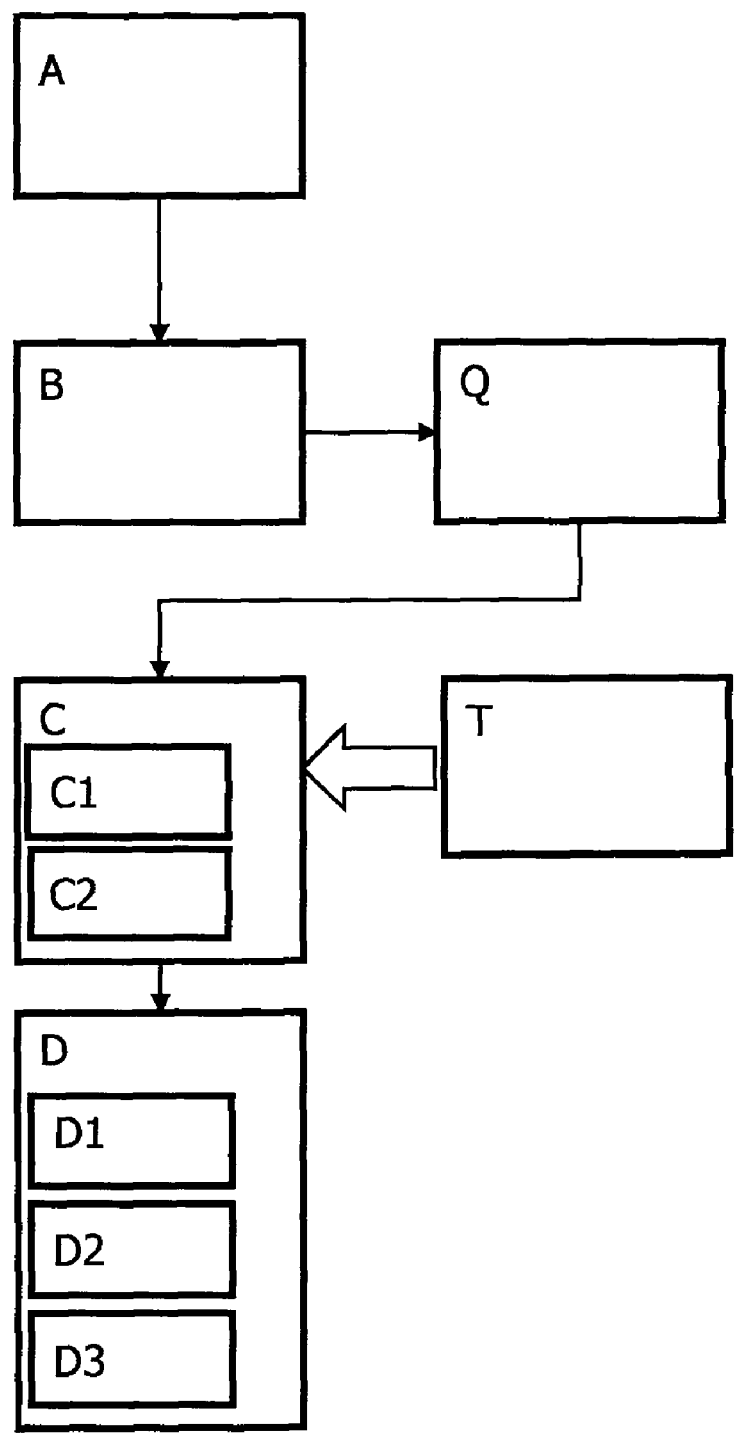
Figure 5:
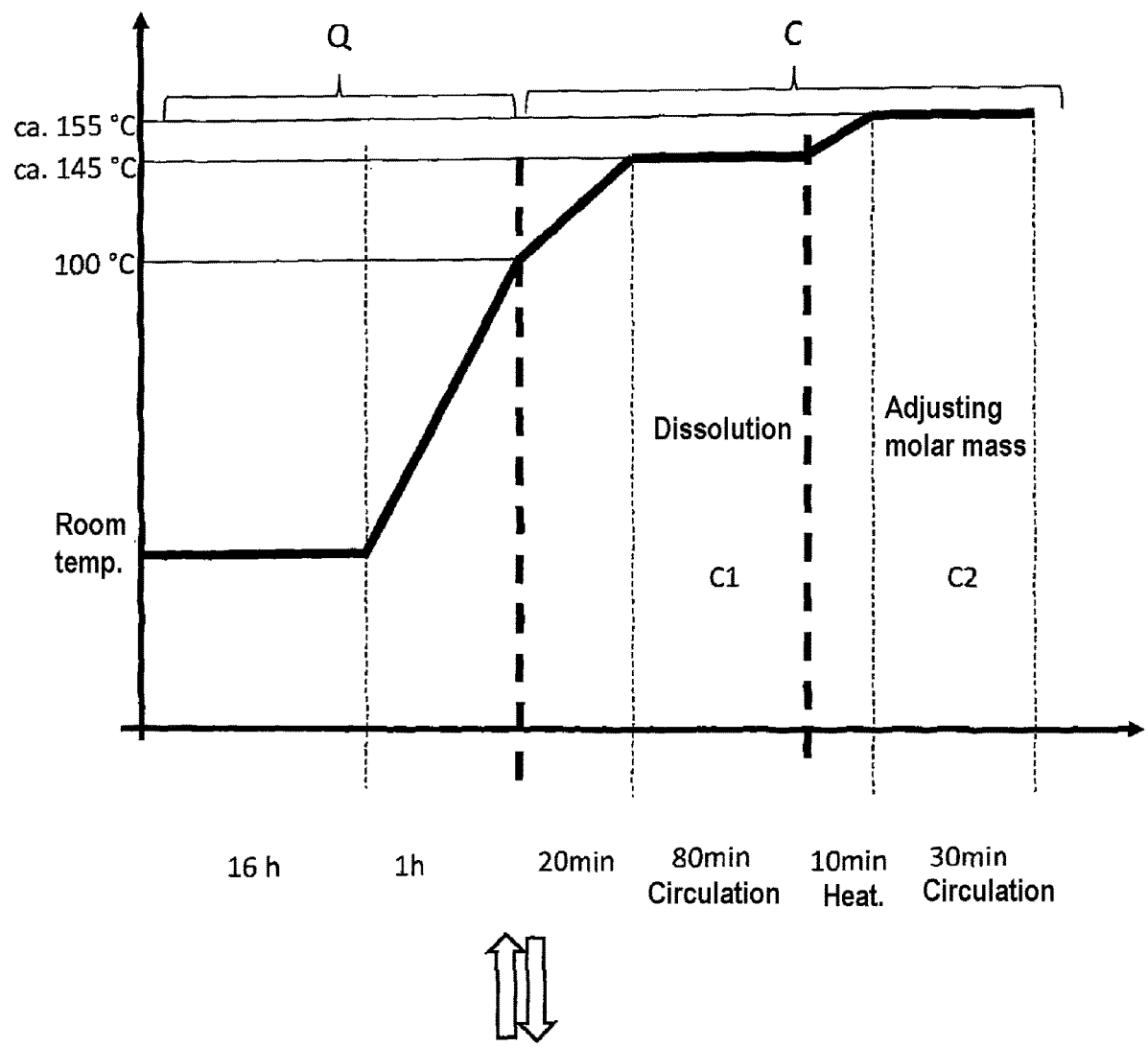
Figure 5A:
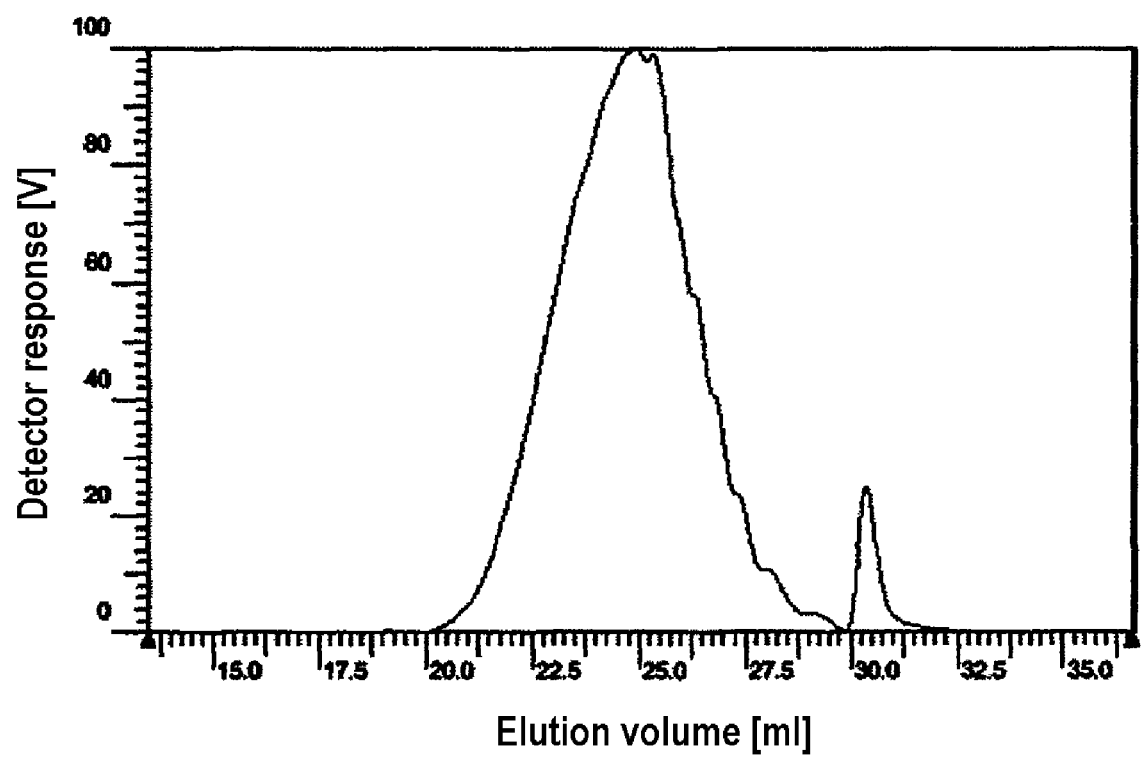
Figure 6:
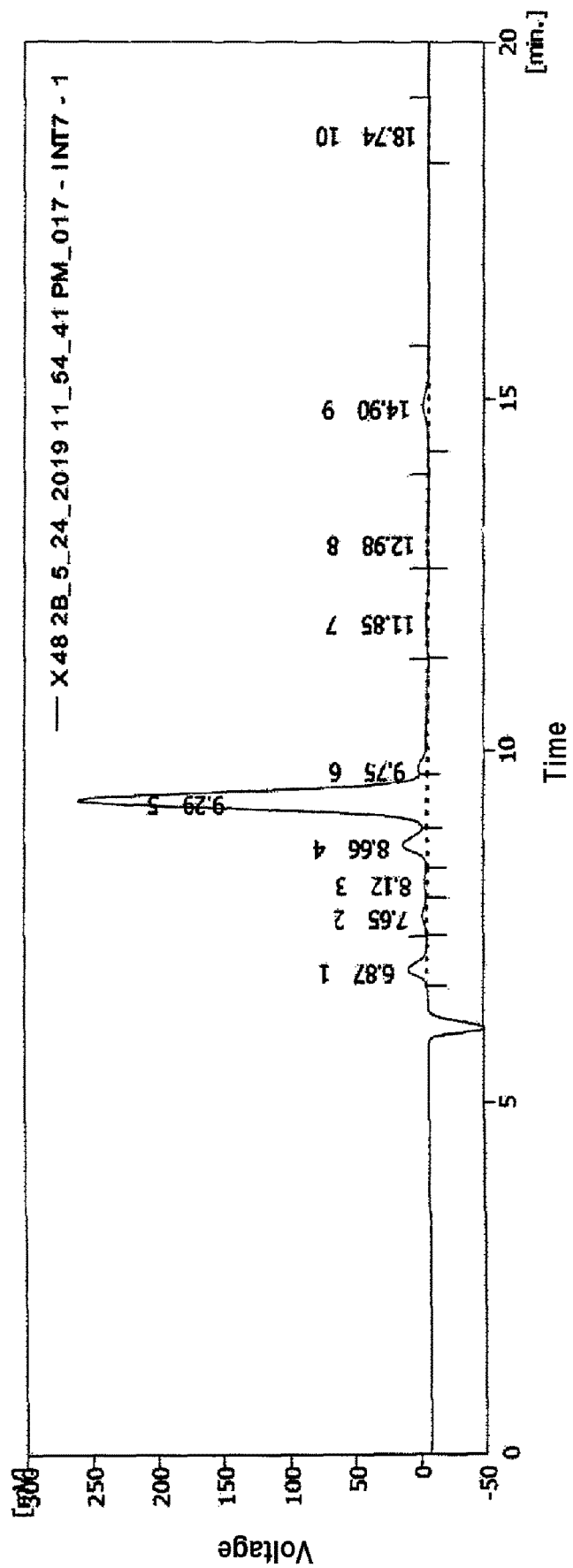
Figure 7:
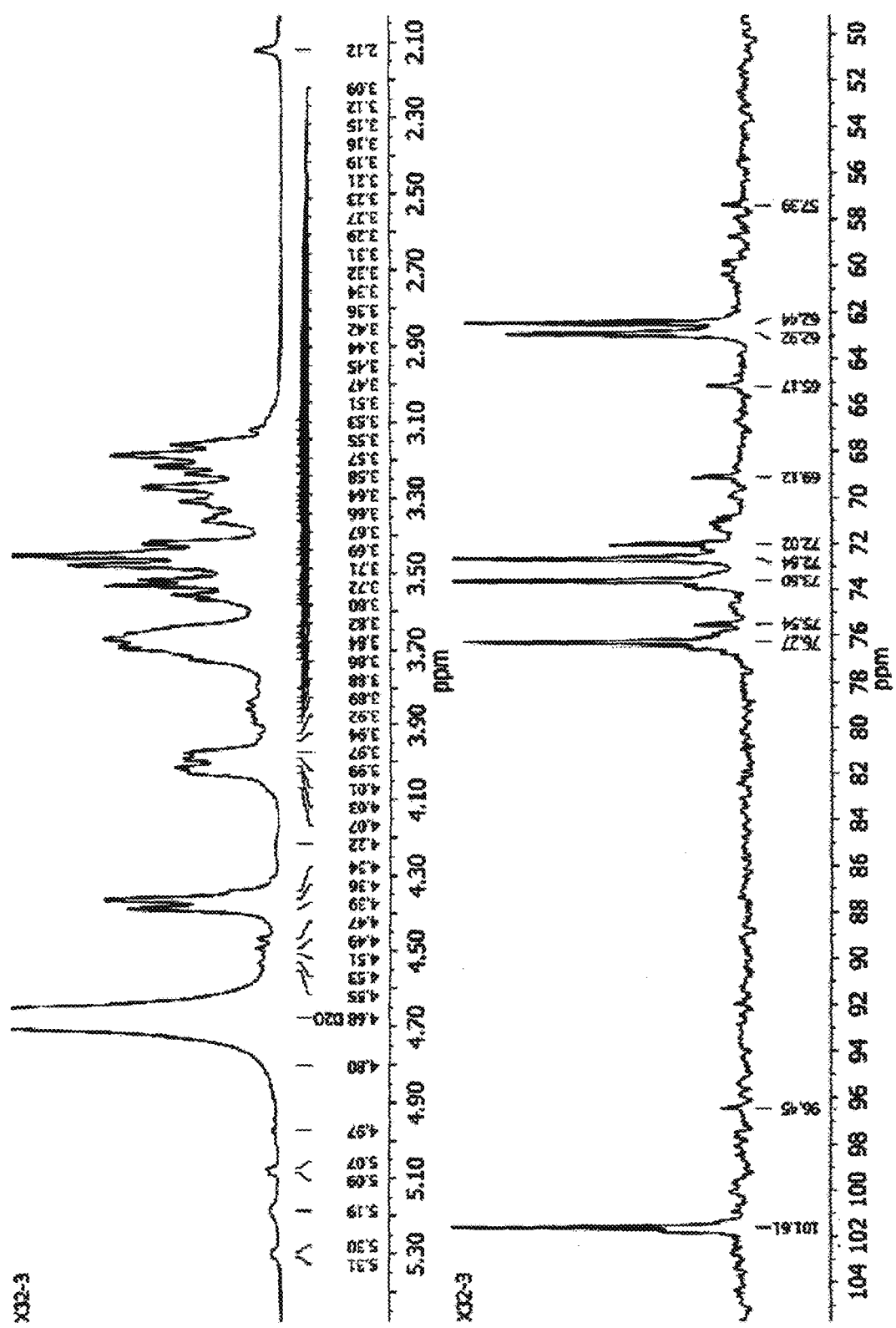
Figure 8:
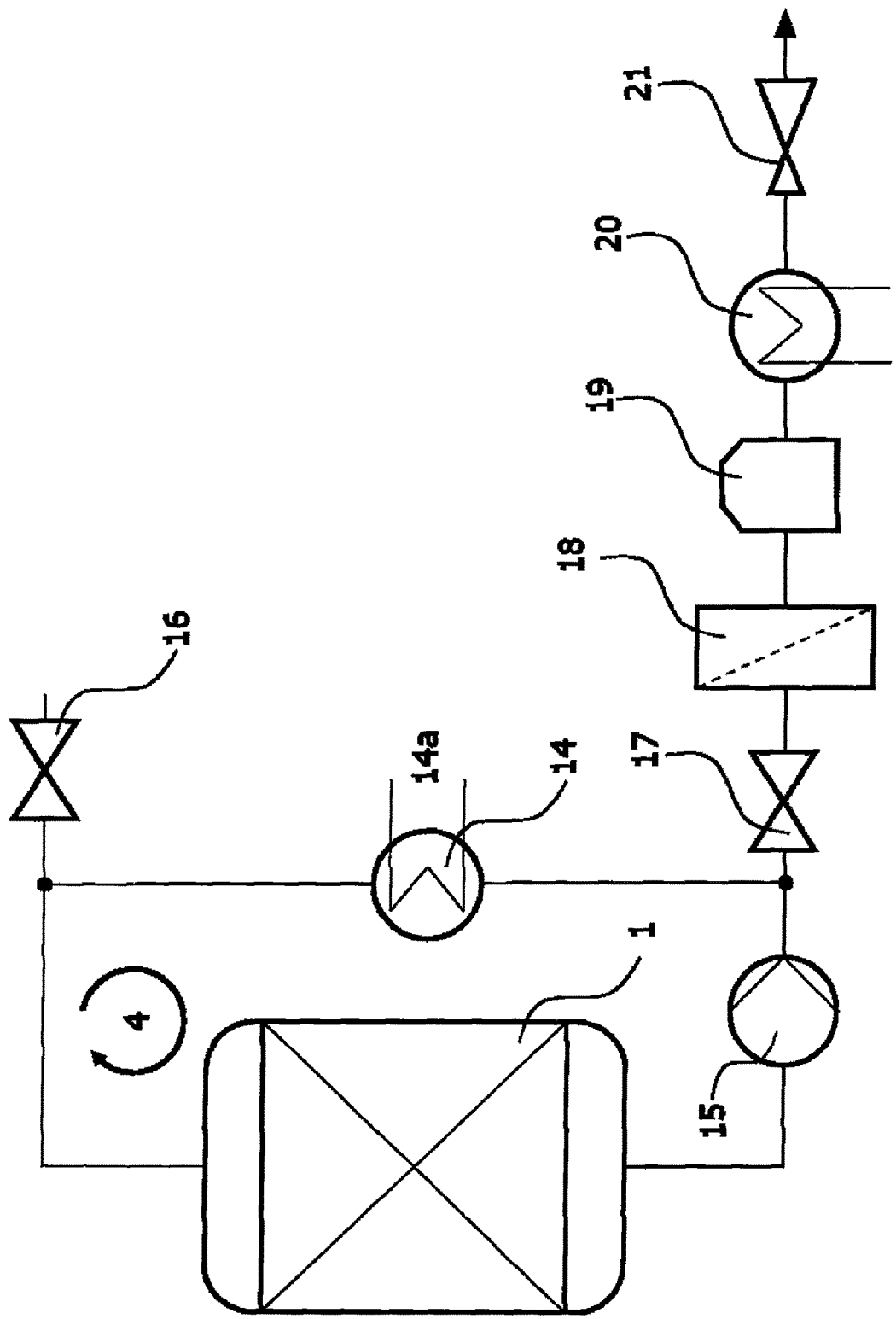

Shown are in:

FIG. 1 a fixed-bed reactor in its principal structure for executing the method, FIG. 2 a reactor in a further embodiment, which is possible for the method, FIG. 3 an exemplary flowchart of the extraction process, FIG. 4 an exemplary flowchart of the extraction process with additional steps, in particular a swelling step, FIG. 5 an exemplary temperature profile in the extraction process, FIG. 5*a* an exemplary size exclusion chromatogram, FIG. 6 an HPLC chromatogram of xylan obtained with the help of the extraction process after an acidic hydrolysis, FIG. 7 an illustrating 1H-spectrum and 13C-NMR spectrum of xylan obtained with the help of the process according to the invention, FIG. 8 an exemplary structure of an extraction plant for executing the method according to the invention.

FIG. 1 shows a fixed-bed reactor in its principal structure for executing the method according to the invention. The fixed-bed reactor shown in FIG. 1 by way of example is constituted by a pressure-resistant reaction chamber having a correspondingly pressure-resistant reactor wall. In operation, it contains an accumulation of comminuted wood components 2, which is filled up with a liquid extracting agent, in the case present here with extraction water 3. The extracting agent covers in this case the accumulation only slightly over the upper level thereof and is continuously circulated during the subsequent extraction steps. On this occasion, the comminuted wood components remain during the entire time of the extraction process within the fixed-bed reactor, while the water volume as a whole is influenced in its temperature, is circulated and is either exchanged in its partial or total volume or is withdrawn from the fixed-bed reactor.

It must be clearly emphasized at this point that the fixed-bed reactor used for the method described here is not operated as a flow reactor. This means in particular that the reaction bed of the wood components is not flown through by a continuously through-flowing and continuously renewed extracting agent. Rather, during the individual extraction phases described further below, the extracting agent added and filled in in each case at the beginning, i.e., the extraction water, remains always the same and is not renewed as such at least during the individual process phases.

In this way, in the process according to the invention with a bath circulation of the extracting agent, basically a smaller water-to-wood relationship as compared to known flow systems, of, for example, 4 litres extraction water per kilogram of wood may be employed, since apart from the plant-contingent dead volumes, only so much extraction water is required in principle, that the voids in the accumulation of the comminuted wood material are filled. Thereby, the extraction volume to be subsequently processed at the same absolute yield of xylan per kg of wood according from several hundreds to several thousands of litres in the known flow systems is reduced to about 60 litres of extraction volume per 1 kg of xylan in the process according to the invention with bath circulation.

Due to the operating mode of extracting with bath circulation of the extracting agent, the properties of the target product may be adjusted in addition in the entire volume of the extract and not only in a temporally arising fraction as in usual flow methods. Thus, over the entire extraction cycle, not a product having certain temporal average properties of the fractions arising at various points of time in flow method is obtained in the method according to the invention, but only one product having just one set of precisely determinable properties is obtained.

Basically, it is not necessarily required for the method according to the invention to lead out the extraction water from the fixed-bed reactor and to introduce it again during the extraction process. Such a leading out is required only insofar as, on this occasion the extraction water can hereby be easily tempered, and thus, a uniform tempering of the reactor may be achieved over the entire cross-section. Furthermore, the flow associated with the course of the circulation allows for particularly efficient mixing of the comminuted wood components and the extracting agent to be achieved, and thus the transition of xylan from the solid extraction product into the liquid extracting agent is promoted.

In principle, it is also possible to achieve the mixing of the extraction product and the extracting agent as well as the tempering of the total amount of water located in the reactor in another way. Thus, the extraction product and the extracting agent can be held in movement by means of an agitator or any other mechanically conveying device located within the reactor and be tempered via a tempering device arranged in or at the reactor itself, i.e., a heating system. However, in this system, the low quantities of liquid necessary for the extraction corresponding to the method according to the invention can only be realized in the case of wood components at high technical effort. The reason for this is that the low quantity of water leads to the fact that the mixture in its totality rather corresponds to a highly swelled, dripping wet solid matter than to a liquid that can be stirred.

As an alternative to a stirred reactor, there is also the possibility of mixing the extraction product and the extracting agent by moving of the entire reaction system, and likewise to temper it via a heating system arranged in or at the reactor itself. However, it is considerably more complex to move a pressure reactor of a corresponding size than to recirculate only some liquid. In principle, such reactors are technically quite feasible, in particular as a so-called tumble reactor.

In the example shown in FIG. 1, the tempering of the extraction water 3 is performed via an extracting agent circuit 4, which contains the corresponding tempering devices, in particular heating systems. At the same time, a continuous mixing movement of the extracting agent with the accumulation of the comminuted wood components is achieved via the flow of the extracting agent circuit.

The fixed-bed reactor has a filler opening 5 for pouring in the comminuted wood components. This opening appropriately is located in the upper part of the reactor vessel. In the lower part, an outlet opening 6 is provided, which can be utilized in the example given here for introducing or leading out the extraction water 3.

In the lateral area of the fixed-bed reactor, a second outlet opening is provided. It likewise serves for the extracting agent circulation.

A fixed-bed screen 8 prevents the comminuted wood components from being driven out through the outlet opening 6 and forms at the same time a solid support for the fixed-bed of the wood components. Complementarily to this fixed-bed screen, the support and fixation of the comminuted wood components may be improved by an appropriate geometrical realization of the reactor vessel itself. A reactor model appropriate for this purpose is realized to be conical in the lower area, so that the screen can be realized having a considerably smaller cross-section and thus is mechanically more stable. At the same time, the flow properties are thus improved.

The tempering of the extraction water 3, i.e., of the volume of the extracting agent, may be performed in the fixed-bed reactor illustrated here such that the extracting agent is introduced under pressure into the fixed-bed reactor via the first outlet opening 6. Hereby, the wood components 2 stored on the fixed-bed screen are uniformly flown through by the extracting agent, and thus a continuous mixing is performed. The extracting agent exits the fixed-bed reactor via the outlet opening 7, is tempered externally, and gets back again immediately into the fixed-bed reactor via the outlet opening 6.

During the operation of the fixed-bed reactor, the filler opening 5 is closed. The entire reactor has overpressure in the interior. The walls of the fixed-bed reactor accordingly are implemented as pressure walls.

If the extracting agent, i.e., the extraction water 3, is intended to be removed from the fixed-bed reactor as a whole or in parts, the outlet thereof is performed via the outlet opening 6. The collected extraction water 3 contains the extracted xylan and can be further processed accordingly.

FIG. 2 shows a further embodiment of a reactor for executing the method according to the invention. The reactor present here, however, is not a fixed-bed reactor, but the reaction bed is continuously stirred. The reactor here contains likewise the filler opening 5 in the upper area. This opening is closed during the operation of the reactor, too. Also, in the embodiment shown here, the reactor has overpressure during the operation.

In addition, a stirring unit 9 is arranged in the inner area of the version of the fixed-bed reactor shown here. This stirring unit has a stirring drive 10 and a stirring rod assembly 11 having a stirring propeller 12 in the example given here. Hereby, the reaction bed of the comminuted wood components 2 and the extraction water 3 is permanently kept in movement and circulated within the fixed-bed reactor.

However, stirred system are in principle technically more complex and thus more expensive. Thus, for instance, in case of the pressures required for hydrothermal extraction, expensive sealing systems are necessary in the area of the stirrers. Since basically larger reactors (pressure vessels) are necessary at the same time, the reactor system with bath circulation is more advantageous in its simpler design in its process provided here.

The tempering of the extraction water 3 and thus of the bath located in the reactor, in the example shown in FIG. 2, is not performed over an extracting agent circuit passing outside of the reactor, but over a heat exchange with the environment occurring via the wall of the reactor, for example, a surrounding heat bath or a subsequent heating circuit. For this reason, the embodiment shown in FIG. 2 has schematically indicated heat exchanger surfaces 13. These are thermally coupled to external heating and/or cooling devices, corresponding circuits and tempering devices like that.

The extraction process will be explained below by way of example. For this purpose, FIG. 3 shows an exemplary flowchart of the extraction process in its simplest configuration, the flowchart in FIG. 4 includes additional partial steps, in FIG. 5 an exemplary inherent temperature profile is shown.

In the method described below by way of example for obtaining xylan, the question is basically hydrothermal extraction. The first important innovation as compared to the known methods of hydrothermal extraction is to use a certain reactor type in conjunction with a special operating mode of the extraction as already mentioned above.

For the processing mode described here, a fixed-bed reactor having bath circulation is used. This means that the wood to be extracted is located in the pressure vessel in the form of wood chips, and the extracting agent water is circulated through this bed of wood chips, wherein the extracting agent can be heated, cooled, renewed or withdrawn as required. The decisive aspect of this operating mode is the circulation (bath circulation) of the extracting agent. This bath circulation, on the one hand, results in intervention possibilities allowing the properties of the xylan to be adjusted, and, on the other hand, the volume of the extracting agent to be kept comparatively low.

It is furthermore possible to realized certain temperature profiles during circulation, and thereby both an adjustment of the molar mass and the acetylation degree of the extracted xylan to be realized.

The advantage of the circulation as compered to a straight throughflow of the extracting agent, if necessary, likewise at a temperature profile, results from the fact that the actual extraction in the sense of increasing the solubility and of adjusting the molar mass as well as the content of acetyl groups follows different reaction kinetics. The decisive advantage as compared to static methods without any flow therefore is the increased mass transfer from the wood chips into the extracting agent. Furthermore, static methods require further steps for adjusting a certain content of acetyl groups.

The extraction process starts with a filling step A of the fixed-bed reactor 1. Thereby, the comminuted wood material is first filled into the reactor up to an intended level. In a filling step B immediately following thereto, the comminuted wood material s filled up with the liquid extracting agent, i.e., in particular with the extraction water 3, until the water level substantially corresponds to the filling level of the comminuted wood material or slightly covers the wood material. The pressure vessel of the reactor is in particular filled with beech wood chips of a grain size from 0.75 to 16 mm, preferably 1 to 4 mm. Then, water is added until the chips are covered.

The thus created reaction bed is subsequently circulated in a circulation step C, wherein this circulation takes place under the influence of a temporal temperature control T. An exemplary temperature profile is illustrated in FIG. 5.

The fresh extraction water is heated to, for example, 130 to 150° C., preferably 135 to 145° C. within about 20 minutes, and subsequently is circulated for 60 to 100 minutes, preferably 70 to 90 minutes at this temperature. This step serves the promotion of the solubility of xylan in the extraction water.

It is decisive in this case that the temperature of the extraction water amounts to more than 130° C. so as to dissolve the xylan, but is kept lower than 150° C. in order to firstly cause not a too high degradation and to minimize the solubilization of lignin as an undesired pollution during the comparatively long extraction time.

Following thereto, the extraction water is heated to 155 to 175° C., preferably 169 to 170° C. within about 10 minutes, and is then circulated at this temperature for about 10 to 50 minutes, preferably 20 to 40 minutes. This step serves for solubilizing further xylan portions in the extraction water. At the same time, the now increased temperature results in an increased winning of xylan, so that the molar mass of the target product can be adjusted by means of this step. At the same time, the content of acetyl groups is reduced.

Decisive in this Case are Three Constraints to be Observed:

The first constraint is that the temperature above 155° C. is initially increased so as to increase the efficiency of the reduction of the molar mass of xylan and of the division of the acetyl groups. Due to that, the molar mass of the extracted xylan and the acetylation degree of the extracted xylan can be influenced effectively.

The second constraint is that the temperature is kept lower than 180° C. Hereby, an undesired solubilization of glucans, especially cellulose fragments, present in wood is kept as low as possible.

The third constraint is that the time during which the temperature of the extraction water is higher than 150° C., is kept as short as possible and not too long so as to keep a solubilization of the lignin contained in wood and thus its entry as an undesired pollution as low as possible.

Further partial steps may be performed within the extraction step C.

FIG. 4 shows an exemplary flowchart of the extraction process having additional partial steps.

Thus, it is possible in the extraction step C, for example, to first execute a dissolution step C1, and after rising the temperature to above 155° C., to exchange the extraction water completely or even partially in an exchange step C2. In this way, either single xylan fractions of different molar mass or having a different content of acetyl groups may be obtained, or a certain distribution can be achieved with respect to these parameters.

Finally, the entire extraction water 3 is withdrawn from the fixed-bed reactor in a step D and is further processed. The reaction water 3 is in this case completely withdrawn from the reactor. The xylan, which is now dissolved in it and adjusted in its molar mass and in its acetylation degree by the preceding method steps, for example, is now precipitated as a solid matter by being introduced into a 4- to 10-fold (v/v) surplus of alcohol (methanol or ethanol). The solid matter fraction is subsequently separated via conventional filtration devices, washed with alcohol and dried. It is now available for manufacturing PPS.

FIG. 4 moreover shows an additional swelling and processing step Q. This step is likewise illustrated in FIG. 5. The swelling and processing step is constituted by the fact that after the filling step B according to the flowchart in FIG. 3, swelling of the wood components with an afterwards occurring exchange of the extraction water is executed. After the extraction water has been added, the wood chips are swelled in step Q for about 16 hours at room temperature. Subsequently, the circulation of the extraction water is started within step Q, and the extraction water is heated to 100° C. within one hour. After the temperature of 100° C. has been reached, the extraction water is removed from the circuit. The removed extraction water contains diverse pollutions, which are not characterized in more detail, but no xylan, and is therefore discarded. This step of swelling increases the efficiency of the subsequent solubilization of xylan. At the same time, the purity of the target product, which is recognisable by its colour, may be improved by discarding the extraction water. Following this swelling and processing step Q, which has been executed in this way, the wood bulk is filled up with fresh extraction water, and the actual extraction step C is started.

Moreover, the withdrawal of the extraction water from the reactor may be modified or complemented independently thereof or even in combination therewith:

In a step D1, the withdrawn extraction water can be conducted through an activated carbon filter. This integration of an activated carbon filter, in particular at the outlet of the reactor, allows lignin extracted necessarily up to a certain degree together with xylan to be removed already prior to the following precipitation in alcohol. This enables, on the one hand, to reduce the subsequently necessary alcohol amount, and allows, on the other hand, to increase the concentration of the extracts without a clogging of the used devices occurring.

In a step D2 it is possible that instead of a heat exchanger cooling the extract at the outlet of the reactor for withdrawal, an evaporator may even be used. Thus, the process heat of the extraction may be directly utilized to remover water from the extraction dissolution and to increase the concentration of the extracts.

In a step D3, it is moreover possible to obtain different fractions having a gradually different molar mass and a very narrow molar mass distribution by a stepwise increase of the relationship of aqueous extract to alcohol during the precipitation. Thus, preferably xylans of high molar mass are precipitated at low relationships, whereas even xylans having a low molar mass can be more and more precipitated with an increasing alcohol amount.

The xylans obtained by the method steps described above are characterized by a certain property profile. Thus, for example, the weight-average molar masses of the xylans may be adjusted in a targeted manner to values of between 1000 and 5000 g/mol. The simultaneous excellent reproducibility of the molar mass distribution represents a significant advantage of the xylans obtained with the help of the process described here. These may be converted into PPS in one step.

FIG. 5a shows the size exclusion chromatogram of xylan obtained with the help of the process described here. It shows that preponderantly the weight-average molar masses of the xylans may be adjusted to values of between 1000 and 5000 g/mol in a targeted manner, and at the same time, a defined molar mass distribution may be achieved. The simultaneous excellent reproducibility of the molar mass distribution represents a significant advantage of the xylans obtained with the help of the process described here. In particular, these may be converted into PPS in one step.

FIG. 6 shows an exemplary HPLC chromatogram of the xylan obtained with the help of the process described here after an acidic hydrolysis. As a whole, the chromatogram shows that the obtained extracts are characterized by a specific sugar composition, which in turn entails a particularly good processability with respect to obtaining PPS.

In particular, the chromatogram proved a content of over 85% of xylose represented by the dominant signal at a retention time of 9.29 minutes. The new process management moreover enables excellent reproducibility with respect to the end groups, for example, represented by the signal at a retention time of 7.65 minutes, as well as of other ancillary sugars. At the same time, the determined high rates of retrievals are a measure for the high purity of the obtained xylan. This is in particular mostly free from lignin/lignin degradation products and other impurities, as can in particular be derived from table 1:

TABLE 1

Results of the sugar analysis of xylan obtained with the help of the process according to the invention.

| sample | rate of retrieval | rha | ara | gal | glu | xyl | man | unknowns [%] |
|---|---|---|---|---|---|---|---|---|
| 1 | 86 | 1.1 | 0.0 | 2.1 | 4.7 | 87.0 | 5.1 | 0.2/0.0 |
| 2 | 87 | 1.0 | 0.0 | 2.2 | 5.0 | 86.9 | 4.9 | 0.2/0.0 |
| 3 | 91 | 1.2 | 0.0 | 2.5 | 4.8 | 86.3 | 5.2 | 0.3/0.0 |
| 4 | 86 | 1.2 | 0.0 | 2.5 | 4.5 | 86.8 | 5.0 | 0.2/0.1 |
| 5 | 89 | 1.2 | 0.0 | 2.5 | 4.8 | 86.8 | 4.7 | 0.2/0.0 |
| 6 | 89 | 1.1 | 0.0 | 2.4 | 4.5 | 87.4 | 4.6 | 0.2/0.0 |
| 7 | 89 | 1.1 | 0.0 | 2.4 | 4.5 | 87.4 | 4.6 | 0.1/0.0 |
| 8 | 89 | 1.2 | 0.0 | 2.5 | 5.0 | 86.4 | 4.9 | 0.3/0.1 |
| 9 | 89 | 1.2 | 0.0 | 2.5 | 4.6 | 87.0 | 4.8 | 0.2/0.1 |
| 10 | 88 | 1.1 | 0.0 | 2.5 | 4.6 | 87.0 | 4.7 | 0.2/0.1 |
| average value | 88 | 1.1 | 0.0 | 2.4 | 4.7 | 86.9 | 4.8 | |
| standard deviation | 1.5 | 0.1 | — | 0.1 | 0.2 | 0.4 | 0.2 | |

Furthermore, it can be shown with the help of NMR spectroscopic analyses that functional groups such as glucuronic acid and acetyl groups are present in a certain amount and are specifically bound.

FIG. 7 here shows an exemplary NMR spectrum, in the upper representation a 1H NMR spectrum, and in the lower representation a 13C NMR spectrum recorded in $D_2O$ at a temperature of 300 K and a spectrometer frequency of 300 MHz. While the dominant peaks in the 13C NMR spectrum at about 101.6; 76.3; 73.6; 72.6 and 62.9 prove the basic structure of the β-(1→4)-D-Xylopyranose backbone, the peaks indicate at about 96.5; 75.5; 69.1; 65.2 and 57.4 ppm the sporadic α-(1→4) substitution of the backbone with 4-O-Me-glucuronic acid. From the peak at about 62.4 ppm in the 13C NMR and the peak at 2.12 in the 1H NMR, the substitution with acetyl groups can be derived and quantified.

As shown, the step of subsequently adjusting the molar mass in the already extracted xylan and thus also the second sulphate adding step can be saved on the basis of the xylan that has been obtained by means of the methods described above. Exactly these steps can be executed with the method according to the invention already during the extraction.

Thus, it is thereby possible to obtain, starting from the xylan extracted by means of the here described steps, a PPS in one step, which is with respect to the pharmaceutically relevant parameters, in particular the content of sulphate groups and of the molar mass, equivalent to the PPS obtained according to the known methods. The decisive advantage of the method according to the invention thus is saving these additional steps according to the state of the art.

FIG. 8 shows an exemplary structure of an extraction plant for executing the method according to the invention, in particular with respect to downstream components for post-processing the extraction water. In the extraction plant shown here, the fixed-bed reactor 1 is the decisive operating element, however, requiring secondary components.

The extracting agent circuit 4 described above includes a heat exchanger 14 for tempering the extraction water 3 circulated within the circuit. In the temperature profile illustrated in FIG. 5, in which the temperature of the extraction water monotonously rises during the single phases of the extraction process and is not lowered from time to time, the heat exchanger 14 is exclusively operated as a heater for the circulated extraction water 3. For this purpose, the heat exchanger 14 is coupled to an external tempering circuit 14a, in which an external heating medium is circulated. The adjustment of the temperature as well as the control of the temperature rise within the extraction water 3 is regulated in the extracting agent circuit 4, for example, via the flow velocity of the extraction water 3 in the extracting agent circuit 4.

A circulating pump 15 serves for circulating the extraction water in the extracting agent circuit 4. The operation of this pump is controlled by a control unit not illustrated here, wherein temperature sensors, likewise not illustrated here, arranged within the extracting agent circuit, record the current value of the temperature of the extraction water.

The extracting agent circuit is initially supplied with fresh water over a feed valve 16. The extracting agent circuit is finally emptied after the extraction process via the switching of a drain valve 17. During the extraction process within the fixed-bed-reactor 1 both the feed valve 16 and the drain valve 17 are closed. However, a so-called fractionated draining of the extraction water is possible. However, there is no continuous throughflow of extracting agent from the feed valve 16 to the drain valve 17. Thus, no throughflow operation is explicitly carried out.

During withdrawal of the extraction water, the drain valve 17 is opened. The circulation pump 15 drains the extraction water from the fixed-bed-reactor 1 and pushes it via the opened drain valve 17 into the withdrawal branch situated behind. This withdrawal branch contains in the example present here an activated carbon filter 18, an evaporator 19 and a heat exchanger 20 functioning as a cooler here.

The activated carbon filter removes, as mentioned, co-extracted lignin from the xylan solution in the extraction water. This separation of lignin enables, on the one hand, the alcohol amount to be reduced, and allows, on the other hand, to increase the concentration of the extracts without a clogging of the used devices occurring.

2The evaporator 19 serves for cooling the outlet extraction water. On the one hand, the water evaporated here can be directly utilized for forwarding the released extraction heat, on the other hand, the concentration of the xylan dissolved in the extraction water is additionally increased by the decreasing water fraction.

In the example provided here, the outlet extraction water is additionally cooled in a heat exchanger 20. The heat likewise released on this occasion my be utilized as a waste heat or also be partially led back to the tempering circuit 14a.

The extraction water exits the withdrawal branch via an outlet valve 21 and is fed to a subsequent process station "precipitation" for precipitating and separating the xylan.

The method according to the invention has been explained on the basis of exemplary embodiments. Further embodiments will result from the subclaims as well as within the scope of expertise action.

LIST OF REFERENCE NUMERALS 1 fixed-bed-reactor
2 comminuted wood components
3 extraction water
4 extracting agent circuit
5 filler opening
6 outlet opening
7 outlet opening
8 fixed-bed screen
9 stirring unit
10 stirring drive
11 stirring rod assembly
12 stirring propeller
13 heat exchange surfaces (schematical)
14 heat exchanger (heater)
14a tempering circuit
15 circulation pump
16 feed valve
17 drain valve
18 activated carbon filter
19 evaporator
20 heat exchanger (cooler)
21 outlet valve
A filling step
B filling-up step
C circulation step
C1 dissolution step
C2 exchange step
D withdrawal step and xylan separation
D1 activated carbon filtering
D2 evaporator cooling
D3 fractionated precipitation by stepwise adding alcohol
Q swelling and processing step

The invention claimed is:

1. A method for extracting xylan compounds, which can be converted into pentosan polysulphate by a subsequent sulfatization, from comminuted wood components using hydrothermal extraction,
wherein
the hydrothermal extraction is carried out in a pressure reactor system for heterogenous reactions in a discontinuous operating mode, and
wherein the hydrothermal extraction is carried out by a bath circulation of the aqueous extracting agent in the pressure reactor system, wherein the pressure reactor system is implemented as a fixed-bed reactor (1).

2. The method according to claim 1,
characterized in that
per kilogram of dry mass of the wood components, a mass of aqueous extracting agent of at least 3 kilograms, at most 15 kilograms is used in the hydrothermal extraction.

3. The method according to claim 1,
characterized in that
the hydrothermal extraction having the bath circulation is carried out by means of the following steps:
preparing a reaction bed by filling a pressure vessel of the fixed-bed reactor (1) with the comminuted wood components (2),
filling the reaction bed with an aqueous extracting agent (3),
circulating the entire amount of the extracting agent (3) via an extracting agent circuit (4) within a predetermined duration of time at a predetermined temporal course of the temperature of the circulated extracting agent (3),
finally withdrawing the entire extracting agent amount from the fixed-bed reactor (1) and subsequently isolating the xylan compounds dissolved within the extracting agent volume.

4. The method according to claim 3,
characterized in that
isolating of the xylan compounds dissolved in the withdrawn amount of the extracting agent (3) is performed by introducing the extracting agent (3) into an alcohol volume with a subsequent precipitation reaction and finally filtering off.

5. The method according to claim 4,
characterized in that,
when the extracting agent (3) is introduced into the alcohol volume, a stepwise increase of the relationship of the extracting agent amount to the alcohol amount is performed, wherein hereby a fractionated precipitation is executed according to the molar mass of the xylan compounds.

6. The method according to claim 3, wherein the aqueous extracting agent (3) is water.

7. The method according to claim 1,
characterized in that
after filling the reaction bed in the pressure vessel of the fixed-bed
reactor (1) with the aqueous extracting agent (3), a swelling bath circulation (Q) with a subsequent entire exchange of the extracting agent is performed as an intermediate step.

8. The method according to claim 7,
characterized in that
in the swelling bath circulation (Q), a heating of the aqueous extracting agent (3) to a temperature of 100° C. to 150° C. is executed, and the extracting agent is circulated for 10 to 90 minutes.

9. The method according to claim 1,
characterized in that
the circulation of the extracting agent (3) is performed in the following partial steps:
performing a first dissolution phase (C1) having a first temperature regime for increasing the solubility of the xylan compounds,
performing a second dissolution phase (C2) having a second temperature regime for adjusting the molar mass and/or the acetylation degree of the xylan compounds dissolved in the extracting agent.

10. The method according to claim 9, characterized in that
during the second dissolution phase (C2), a complete or partial exchange of the extracting agent (3) is performed, wherein a fractionated withdrawal of dissolved xylan compounds having different molar masses and/or of dissolved xylan compounds having different acetylation degrees is performed.

11. The method according to claim 9, characterized in that
the temperature regime in the second dissolution phase (C2) is implemented by heating the extracting agent to a target temperature of at least 150° C. up to a maximum of 210° C., and the extracting agent (3) is circulated at this target temperature for at least 10 minutes up to a maximum of 50 minutes.

12. The method according to claim 1, characterized in that
in the final withdrawal of the entire extracting agent amount (3) and/or in the complete or partial exchange of the extracting agent (3), a passing of the drained extracting agent through a lignin filtering device with elimination of lignin fractions is performed.

13. The method according to claim 1, characterized in that
in the final withdrawal of the entire extracting agent amount and/or in the complete or partial exchange of the extracting agent (3), a heat transfer device is used for cooling the extracting agent (3).

14. The method according to claim 13, characterized in that
the heat transfer device is an evaporator utilizing the heat emitted by the extracting agent.

15. The method according to claim 1, characterized in that
the extracted xylan compounds are sulphated to pentosan polysulphate (PPS) in a polar and basic solvent by means of sulfonic acid without the use of co-solvency.

16. The method according to claim 1, characterized in that
per kilogram of dry mass of the wood components, a mass of aqueous extracting agent of at least 3 kilograms, at most 7 kilograms is used in the hydrothermal extraction.

* * * * *